United States Patent
Evangelides et al.

(10) Patent No.: US 6,311,002 B1
(45) Date of Patent: Oct. 30, 2001

(54) METHOD AND APPARATUS FOR REDUCING NONLINEAR PENALTIES BY PROPER ARRANGEMENT OF THE DISPERSION MAP IN AN OPTICAL COMMUNICATION SYSTEM

(75) Inventors: Steven G. Evangelides, Redbank; Ekaterina A. Golovchenko, Colts Neck; Vincent J. Mazurczyk, Manalapan; Alexei N. Pilipetskii, Colts Necks, all of NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/204,044

(22) Filed: Dec. 1, 1998

(51) Int. Cl.[7] .............................. G02B 6/02; H04B 10/00
(52) U.S. Cl. .................... 385/123; 385/124; 385/126; 359/161
(58) Field of Search .................... 385/123–128; 359/161

(56) References Cited

U.S. PATENT DOCUMENTS

| | | | | |
|---|---|---|---|---|
| 5,559,920 | * | 9/1996 | Chraplyvy et al. | 385/123 |
| 5,696,614 | * | 12/1997 | Ishikawa et al. | 359/161 |
| 6,021,235 | * | 2/2000 | Yamamoto et al. | 385/24 |

\* cited by examiner

*Primary Examiner*—Phan T. H. Palmer
*Assistant Examiner*—Amanda Merlino

(57) ABSTRACT

A method and apparatus is provided for compensating for dispersion in a wavelength division multiplexed (WDM) optical communication system. The system includes a transmitting and receiving terminal for transmitting and receiving, respectively, an optical signal having a plurality of channels, and an optical fiber transmission path coupling the first and second terminals. The fiber transmission path has a dispersion substantially equal to zero for a selected channel, positive dispersion for a first set of channels, and negative dispersion for a second set of channels. The method begins by providing positive dispersion compensation to the second set of channels at one of the terminals. Negative dispersion compensation is provided to the first set of channels, also at one of the terminals.

15 Claims, 2 Drawing Sheets

METHOD AND APPARATUS FOR REDUCING NONLINEAR PENALTIES BY PROPER ARRANGEMENT OF THE DISPERSION MAP IN AN OPTICAL COMMUNICATION SYSTEM

FIELD OF THE INVENTION

The invention relates generally to optical fiber communication systems and more particularly to an optical fiber communication system that employs dispersion mapping to reduce penalties arising from nonlinear interactions.

BACKGROUND OF THE INVENTION

Transmission performance of long-haul optical communication systems such as transoceanic systems is limited by a number of phenomena, including amplified spontaneous emission (ASE) noise accumulation, dispersion, and a nonlinear component to the refractive index of the fiber. If the signal travels at the zero dispersion wavelength it will not suffer any temporal distortions. However, at the zero dispersion wavelength the signal and the ASE noise generated by the optical amplifiers travel at similar velocities (good phase matching) and thus have the opportunity to interact over long distances, via the Kerr effect. The result is the transfer of power out of the signal and into unwanted wavelengths.

Conversely if the signal propagates at a wavelength for which the dispersion is large then there is a large phase mismatch (group velocity difference) between the signal and noise, which greatly reduces the efficiency of four wave mixing. However, large values of dispersion result in increased inter-symbol interference due to the temporal spreading of the signal.

One of the most deleterious nonlinear interactions is known as modulation instability, which occurs for signal wavelengths that are less than about one nm greater than the zero dispersion wavelength. As a result of modulation instability, any fluctuations in the signal intensity caused by noise or dispersive effects that change the signal envelope shape will be enhanced by the Kerr effect through self phase modulation.

In known transmission systems dispersive and nonlinear distortions are simultaneously minimized by a dispersion management technique. One dispersion management technique is known as dispersion mapping, in which the zero dispersion wavelengths of the constituent fibers are chosen so that they are appropriately far from the system's operating wavelengths. Constituent fibers with different zero dispersion wavelengths are then arranged in some periodic fashion so that the path average dispersion for the whole transmission line is appropriately small. For example, the transmission line may be divided into two or more sections approximately equal length. In one section, the optical fiber has a zero dispersion wavelength less than the operating wavelengths. The following section has optical fiber with a zero dispersion wavelength greater than the operating wavelengths. The overall transmission line is thus constructed in a periodic manner from a concatenation of fiber sections having different zero dispersion wavelengths. By constructing the transmission line out of alternating lengths of positive and negative dispersion fiber, the path average dispersion can be adjusted so that it causes minimal temporal distortion. Moreover, by selecting the local dispersions of the constituent fibers to be large in magnitude, nonlinear interactions can be suppressed. Typically in dispersion managed systems the amount of positive and negative dispersion that is provided are equal to one another so that there is no net accumulated dispersion over the entire transmission line.

One factor complicating the dispersion map for a wavelength-division multiplexed transmission system is that optical fiber generally has a nonzero dispersion slope. That is, different wavelengths experience different dispersion values in a given fiber. As a result, in a WDM transmission system employing a plurality of wavelengths, the dispersion map can return the accumulated dispersion to zero for only one wavelength. All the other wavelengths will accumulate some net dispersion, which can be compensated on a channel by channel basis at the transmitter or receiver. As with a single channel system employing dispersion management, the net accumulated dispersion of the individual wavelengths in a WDM system is typically returned to zero.

Optimal or near optimal performance can be achieved by precise tailoring of the dispersion map to reduce nonlinear impairments for a given wavelength. In particular, it would be desirable to provide a dispersion map in which nonlinear penalties arising from self-phase modulation and the nonlinear interaction between the signal and ASE noise are reduced.

SUMMARY OF THE INVENTION

In accordance with the present invention, a method and apparatus is provided for compensating for dispersion in a wavelength division multiplexed (WDM) optical communication system. The system includes a transmitting and receiving terminal for transmitting and receiving, respectively, an optical signal having a plurality of channels, and an optical fiber transmission path coupling the first and second terminals. The fiber transmission path has a dispersion substantially equal to zero for a selected channel, positive dispersion for a first set of channels, and negative dispersion for a second set of channels. The method begins by providing positive dispersion compensation to the second set of channels at one of the terminals. Negative dispersion compensation is provided to the first set of channels, also at one of the terminals.

In accordance with one aspect of the invention, the step of providing positive dispersion compensation to the second set of channels is performed by the transmitting terminal.

In accordance with another aspect of the invention, the step of providing negative dispersion compensation to the first set of channels is performed by the receiving terminal.

The present invention advantageously allows the accumulated dispersion of each channel of a WDM signal to be individually compensated so that each channel's performance can be optimized. Optimization is achieved by appropriately adjusting the portion of the total dispersion compensation that is provided at the transmitting and, receiving terminals.

DETAILED DESCRIPTION

Figure 1:
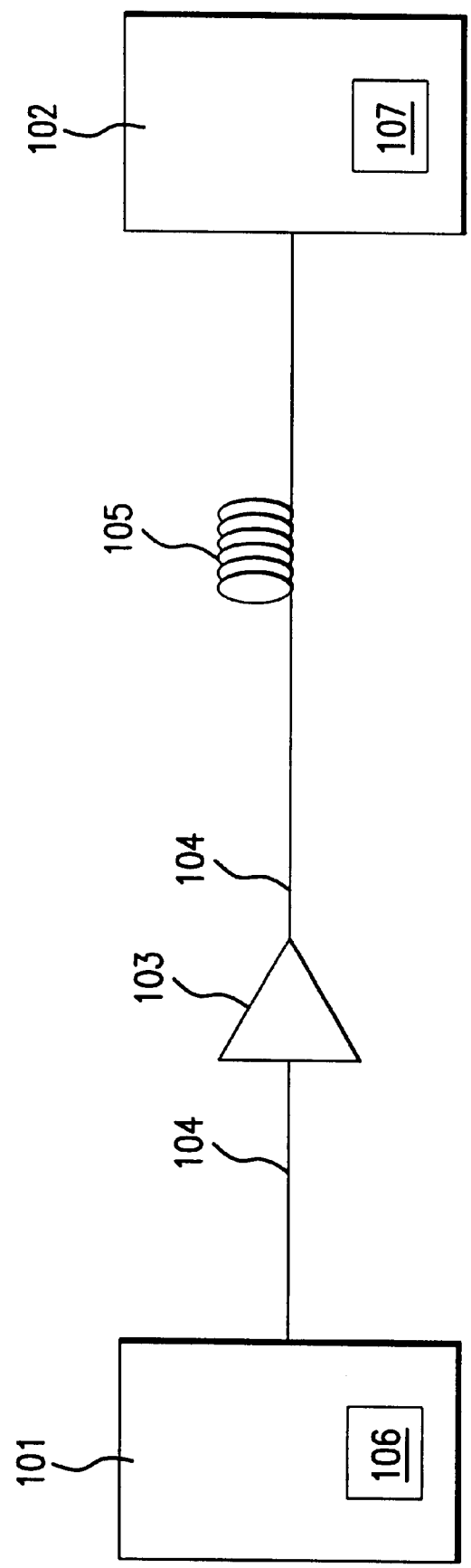
FIG. 1 shows a simplified block diagram of an exemplary optical fiber transmission system in accordance with the present invention.

FIG. 1 shows a simplified block diagram of an exemplary optical fiber transmission system in accordance with the present invention. The system includes an optical transmission path 100, a transmitting terminal 101, a receiving terminal 102, one or more optical amplifiers 103 and dispersion compensating elements 106 and 107, which are located at the transmitting and receiving terminals, respectively. The transmitting terminal 101 provides an optical data signal that is to be transmitted to the remotely located receiving terminal 102 via the optical fiber transmission path 100. The optical signal may comprise a plurality of WDM optical carrier wavelengths on which data is modulated in any appropriate transmission format.

The dispersion compensating elements 106 may be any appropriate device that can provide dispersion compensation. Exemplary dispersion compensating elements include single-mode fibers and diffraction gratings. Dispersion compensating elements 106 and 107 may or may not be directly incorporated into the terminals themselves. In some cases in which single-mode fibers are employed, the dispersion compensating elements 106 and 107 may be a part of the transmission path located in the vicinity of the transmitting and receiving terminals, respectively.

The transmission path comprises a plurality of successive spans having alternating signs of dispersion to substantially compensate for the dispersion of a given wavelength. In one embodiment of the invention the transmission path 100 comprises a dispersion map in which a series of transmission sections (referred to as the constituent fibers) are provided which have dispersion shifted fiber spans of negative dispersion. In other words, the constituent transmission fibers have an average zero dispersion wavelength higher than the operating wavelengths of the system. The constituent fiber spans are followed by a dispersion-compensating fiber having positive dispersion. Alternatively, in some embodiments of the invention, the transmission path may have a substantially constant value of dispersion along its length.

The exemplary embodiment of the invention in FIG. 1 shows a single period of the dispersion map consisting of optical amplifiers 103, spans of transmission fiber 104, and dispersion compensating fiber 105. In a typical long-haul system, this series of components constituting the dispersion map period might be repeated a number of times over the length of the system. The optical amplifiers may be erbium-doped fiber amplifiers (EDFAs), for example, which amplify optical signals in the 1550 nm wavelength band.

As previously mentioned, in a WDM system different channels or wavelengths will experience different path average dispersions because of the non-zero dispersion slope of optical fiber. As detailed below, the present inventors have determined that the accumulated dispersion of each channel of a WDM signal can be individually compensated so that each channel's performance can be optimized.

Theoretical analysis of an intensity modulated signal propagating through an optical fiber shows that as a result of nonlinear ASE noise-signal interactions, the signal variance increases for channels in which <D>>0 and that the signal variance decreases for channels in which <D><0 (i.e., noise squeezing regime). For detailed discussions of ASE noise-signal interactions, see Hui et al., Electron Lett, 32, 2001, (1996) and Midrio et al., Electron Lett, 33, 1066, (1997), for example. However, as discussed below, the performance advantage accruing from operating in the noise squeezing regime is limited by pulse shape distortion due to the irreversible interaction of self-phase modulation with the dispersion.

Figure 2:
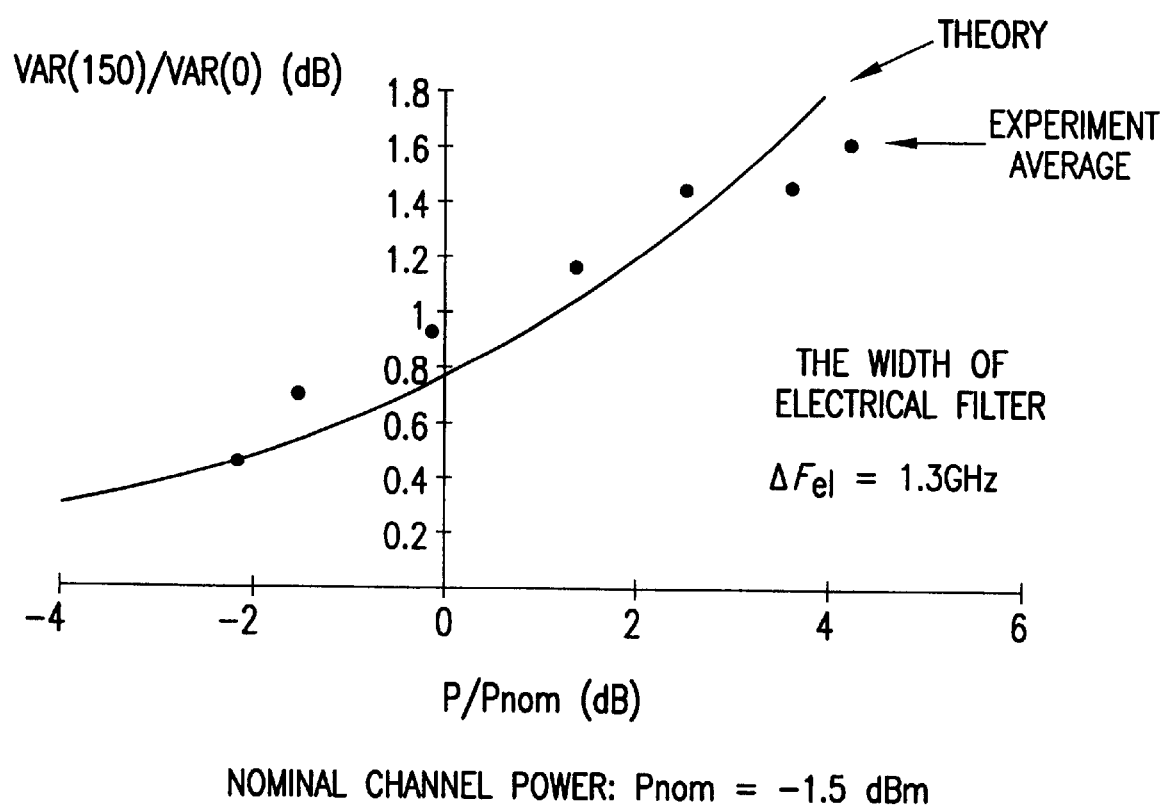
FIG. 2 shows the signal variance with and without dispersion compensation at the receiving terminal.

Experiments have shown that in the noise squeezing regime, if the amount of dispersion compensation provided at the receiver end is increased, the signal variance increases. The results of one such experiment are shown in FIG. 2, which shows the signal variance without any dispersion compensation at the receiver and with a 150 km dispersion compensating fiber at the receiver. Additional experiments have also shown that the signal variance due to ASE noise-signal interaction does not change with a change in the dispersion compensation provided at the transmitter. This result suggests that for those channels operating in the noise squeezing regime (i.e., <D><0), any additional dispersion compensation that is required should be placed at the transmitter (pre-compensation) so that the signal variance enhancement due to ASE noise-signal nonlinear coupling is not increased.

A model of the interplay between the self-phase modulation and group velocity dispersion shows that there is a system performance penalty due to eye closure. The penalty is sensitive to both pre and post dispersion compensation.

If the total change in the Q value due to nonlinear penalties is $Q_{nl}$, then $Q_{nl}$ may be expressed as the sum of $Q_n$, which is the change in Q value due to nonlinear ASE noise-signal interactions, and $Q_e$, which is change in Q due to the interplay between SPM and dispersion (electrical eye closure). That is, $Q_{nl} = Q_n + Q_e$.

Since $Q_n$ is only sensitive to post dispersion compensation and $Q_e$ is sensitive to both pre and post dispersion compensation, in accordance with the present invention, pre-compensation is first provided to maximize $Q_e$ and then any additional post-compensation is provided to maximize $Q_n$.

Based on the above factors, the present inventors have determined that:

A) as stated above, for those channels operating in the noise squeezing regime (i.e., <D><0), any additional (positive) dispersion compensation that is required should be placed at the transmitter (pre-compensation) so that the signal variance due to ASE noise-signal is not increased;

B) for those channels that experience a positive path average dispersion (i.e., <D>>0), any additional (negative) dispersion compensation should be provided at the receiver (post-compensation).

Accordingly, by imparting dispersion compensation in the prescribed manner, the accumulated dispersion for each channel of a WDM signal can be compensated individually. By providing dispersion compensation at both the transmitter and receiver, each channel's performance can be optimized. Optimization is achieved not only by the total amount of dispersion compensation that is provided, but also by the fraction of the total dispersion compensation which is provided at the transmitter and the receiver.

What is claimed is:

1. A method of compensating for dispersion in a WDM optical communication system having a plurality of channels, said system including a transmitting and receiving terminal for transmitting and receiving, respectively, an optical signal, and an optical fiber transmission path coupling said first and second terminals, wherein said fiber transmission path has a dispersion substantially equal to zero for a selected channel and positive dispersion for a first set of channels and negative dispersion for a second set of channels, said method comprising the steps of:

providing positive dispersion compensation to the second set of channels at or adjacent said transmitting terminal; and providing negative dispersion compensation to the first set of channels at or adjacent said receiving terminal.

2. The method of claim 1 wherein said transmission path includes a plurality of successive spans having alternating sign of dispersion to substantially compensate for dispersion of the selected channel arriving at the receiving terminal.

3. The method of claim 1 wherein said transmission path has a substantially constant value of dispersion along the length thereof.

4. The method of claim 1 wherein said positive dispersion compensation is in an amount sufficient to provide a net positive accumulated dispersion over the transmission path.

5. The method of claim 1 wherein said negative dispersion compensation is in an amount sufficient to provide a net negative accumulated dispersion over the transmission path.

6. An optical transmission system comprising:
   a transmitting and receiving tenninal for transmitting and receiving, respectively, an optical signal having a plurality of channels;
   an optical fiber transmission path coupling said transmitting and receiving terminals, wherein said fiber transmission path has a dispersion substantially equal to zero for a selected channel and positive dispersion for a first set of channels and negative dispersion for a second set of channels;
   means for providing positive dispersion compensation to the second set of channels at or adjacent said transmitting terminal; and
   means for providing negative dispersion compensation to the first set of channels at or adjacent said receiving terminal.

7. The method of claim 6 wherein said transmission path includes a plurality of successive spans having alternating sign of dispersion to substantially compensate for dispersion of the selected channel arriving at the second terminal.

8. The method of claim 6 wherein said transmission path has a substantially constant value of dispersion along the length thereof.

9. The method of claim 6 wherein said positive dispersion compensation means provides dispersion in an amount sufficient to provide a net positive accumulated dispersion over the transmission path.

10. The method of claim 6 wherein said negative dispersion compensation means provides dispersion in an amount sufficient to provide a net negative accumulated dispersion over the transmission path.

11. A method of transmitting an optical signal through an optical transmission system, said system including a transmitting and receiving terminal for transmitting and receiving, respectively, an optical signal, and an optical fiber transmission path coupling said transmitting and receiving terminals, wherein said fiber transmission path has a dispersion substantially equal to zero for a selected channel and positive dispersion for a first set of channels and negative dispersion for a second set of channels, said method comprising the steps of:
   generating a WDM optical signal having a plurality of channels that includes the first and second sets of channels;
   transmitting said optical signal through the transmission path;
   providing positive dispersion compensation to the second set of channels at or adjacent said transmitting terminal; and
   providing negative dispersion compensation to the first set of channels at or adjacent said receiving terminal.

12. The method of claim 11 wherein said transmission path includes a plurality of successive spans having alternating sign of dispersion to substantially compensate for dispersion of the selected channel arriving at the receiving terminal.

13. The method of claim 11 wherein said transmission path has a substantially constant value of dispersion along the length thereof.

14. The method of claim 11 wherein said positive dispersion compensation is in an amount sufficient to provide a net positive accumulated dispersion over the transmission path.

15. The method of claim 11 wherein said negative dispersion compensation is in an amount sufficient to provide a net negative accumulated dispersion over the transmission path.

* * * * *